(12) United States Patent
Gattu et al.

(10) Patent No.: US 9,734,344 B2
(45) Date of Patent: Aug. 15, 2017

(54) PROVIDING CONTROL IN A MULTI USER ENVIRONMENT

(71) Applicant: Samsung Electronics Co., Ltd., Suwon-si, Gyeonggi-do (KR)

(72) Inventors: Balasubrahmanyam Gattu, Cupertino, CA (US); Karthik Balakrishnan, Santa Clara, CA (US); Hashir Khan, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 14/334,937

(22) Filed: Jul. 18, 2014

(65) Prior Publication Data

US 2015/0235033 A1  Aug. 20, 2015

Related U.S. Application Data

(60) Provisional application No. 61/941,236, filed on Feb. 18, 2014.

(51) Int. Cl.
*G06F 21/60* (2013.01)
*G06F 21/45* (2013.01)

(52) U.S. Cl.
CPC ............ *G06F 21/604* (2013.01); *G06F 21/45* (2013.01)

(58) Field of Classification Search
CPC ....... H04L 63/04; H04L 63/20; H04L 63/102; H04L 63/0227; H04L 12/287; H04L 12/2856; H04L 41/0893; H04L 63/107; H04L 63/108; H04L 12/28; H04L 12/24; H04L 29/06; G06F 21/6218; G06F 21/604; G06F 15/16
See application file for complete search history.

(56) References Cited

U.S. PATENT DOCUMENTS

| | | | | |
|---|---|---|---|---|
| 8,850,049 | B1 * | 9/2014 | Qureshi | 709/229 |
| 8,886,925 | B2 * | 11/2014 | Qureshi et al. | 713/150 |
| 2012/0102564 | A1 * | 4/2012 | Schentrup et al. | 726/16 |

OTHER PUBLICATIONS

Warkentin, Merrill; Vaughn, Rayford. Enterprise Information Systems Assurance and System Security; Idea Group Publishing, 2006; p. 328.*
"White Paper 4th Generation Intel® Core Processors and Intel® Atom Processors Intel and Windows 8.1* Mobility: Windows* Device Management Goes Mobile", Jan. 1, 2013, pp. 1-5.
Gessner et al., "Towards a User-Friendly Security-Enhancing BYOD Solution", NEC Technical Journal, Mar. 1, 2013, vol. 7, No. 3.

* cited by examiner

*Primary Examiner* — Benjamin Lanier
(74) *Attorney, Agent, or Firm* — Jefferson IP Law, LLP (57) ABSTRACT

A method for receiving a policy is provided. The method includes receiving a policy, determining a context based on the received policy, and applying the policy, based at least in part on the determined context, to a user space of an electronic device.

16 Claims, 6 Drawing Sheets

PROVIDING CONTROL IN A MULTI USER ENVIRONMENT

CROSS-REFERENCE TO RELATED APPLICATION(S)

This application claims the benefit under 35 U.S.C. §119(e) of a U.S. Provisional application filed on Feb. 18, 2014 in the U.S. Patent and Trademark Office and assigned Ser. No. 61/941,236, the entire disclosure of which is hereby incorporated by reference.

TECHNICAL FIELD

The present disclosure relates to an apparatus and method for providing control in a multi user environment. More particularly, the present disclosure relates to an electronic device supporting a multi user environment in which a device administrator may be present in each specific user space to control each specific user space.

BACKGROUND

The present disclosure relates to an electronic device supporting a multi user environment.

In various settings, it is beneficial to employ one or more multi-user-enabled devices that are capable or being controlled remotely by an administrator. For example, in a large company or in an organization which issues multi-user enabled devices to its employees, an administrator may be capable of controlling each device remotely in order to provide critical updates, to install needed applications, and the like. However, since the administrator must install a client in each separate user space of each device to be managed, each of system complexity and administrative burden may increase.

Therefore, a need exists for an apparatus and a method in which a device administrator is not required to be present in each of one or more specific user spaces in order to control each specific user space.

SUMMARY

Aspects of the present disclosure are to address at least the above-mentioned problems and/or disadvantages and to provide at least the advantages described below. Accordingly, an aspect of the present disclosure is to provide an apparatus and method for supporting a multi user environment in which a device administrator may be present in each of multiple specific user spaces to control each specific user space.

According to an aspect of the present disclosure a method of receiving a policy is provided. The method includes receiving a policy, determining a context based on the received policy, and applying the policy, based at least in part on the determined context, to a user space of an electronic device.

In accordance with another aspect of the present disclosure, an electronic device is provided. The electronic device includes a proxy administrator module in a user space, the proxy administrator module configured to create or to activate a proxy mobile device management agent inside the user space.

According to another aspect of the present disclosure, a system is provided. The system includes an electronic device including a proxy administrator module in a user space, the proxy administrator module configured to create or to activate a proxy mobile device management agent inside the user space.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Detailed descriptions of various aspects of the present disclosure will be discussed below with reference to the attached drawings. The descriptions are set forth as examples only, and shall not limit the scope of the present disclosure.

The following detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Terms as used in the present disclosure are used to describe the various embodiments of the present disclosure, and are not intended to limit the present disclosure. Singular terms are intended to include plural forms, unless the context makes it clear that plural forms are not intended.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, an electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for allowing a device administrator to have administrative control over user spaces (e.g., a guest user space or other user space having fewer than all administrative rights) and policies from an administrator/owner user space.

Figure 1:
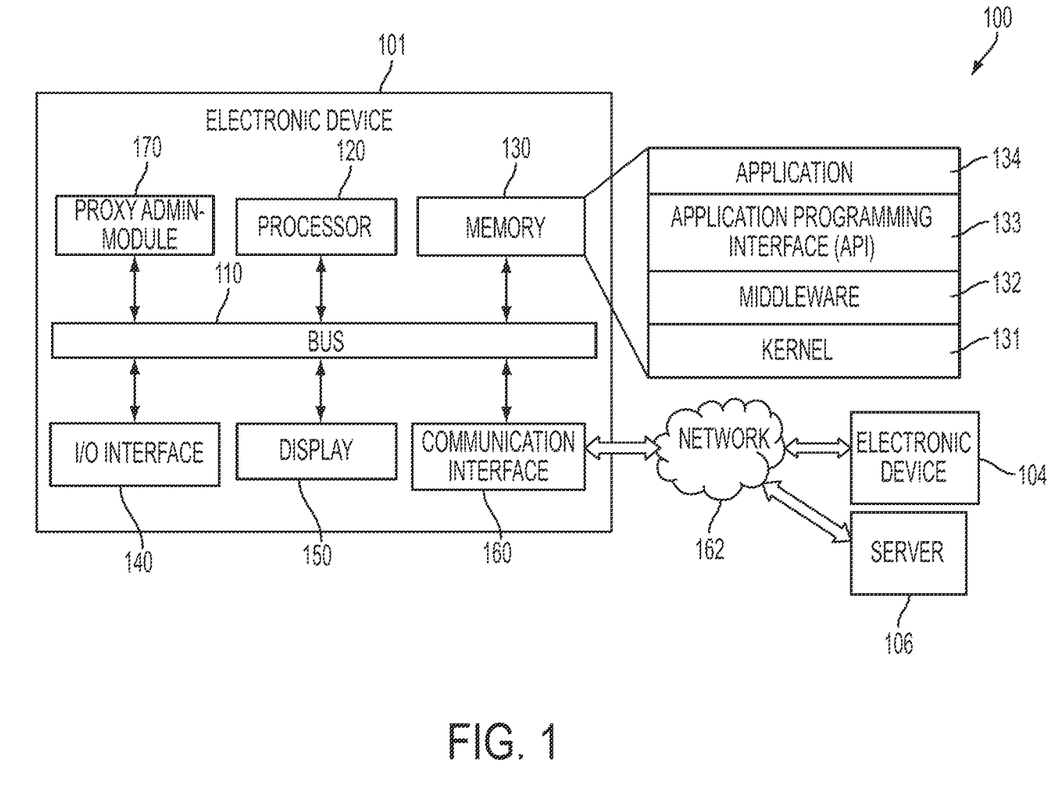
FIG. 1 illustrates a network environment including an electronic device according to an embodiment of the present disclosure.

Various embodiments of the present disclosure relate to providing a policy administration framework where a device administrator of an electronic device (e.g., electronic device 101) that supports a multi user environment (i.e., a "multi user device") may have flexibility in controlling the multi user device. When a device administrator chooses to control a user space from an administrator/owner user space, the framework may add a proxy administrator in each user space, and all or some of the user polices associated with the multi user device may be applied against the proxy administrator. According to an embodiment of the present disclosure, the owner/device administrator may specify a user context while applying policies to the user.

According to an embodiment of the present disclosure, the device administrator may have options to control all users, or to control a selected number of users. The device administrator may also delegate some or all of its rights to a specific user (e.g., a user having more rights than a guest user, but fewer rights than an administrator) to control other users (e.g., guest users).

According to an embodiment of the present disclosure, a Proxy Administrator Module may be provided. The Proxy Administrator Module may function to create, to plug-in and/or to activate a proxy administrator inside a user space (e.g., a guest user space or other user space having fewer than all administrative rights).

According to an embodiment of the present disclosure, a Context Module may be provided. The Context Module may provide the ability to obtain one or more policy objects when the device administrator provides instructions to apply polices for a user space. The Context Module may take care of applying policies to correct a user space based on a context provided. Context validation may be done based on device administrator privileges.

According to an embodiment of the present disclosure, the Proxy Administrator Module and/or the Context Module may be provided at the multi user device or at an external electronic device (e.g., a server) that may communicate with the multi user device.

FIG. 1 illustrates a network environment including an electronic device according to an embodiment of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a proxy administrator module 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the proxy administrator module 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the proxy administrator module 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of the electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of the electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). In an embodiment, the application 134 that is associated with the information exchange may include a notification relay application that may provide the external electronic device with a certain type of information, a device management application that may manage the external electronic device, and/or the like.

In an embodiment, the notification relay application may include a functionality that provides notification generated by other applications at the electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, a receive notification from an external electronic device (e.g., the electronic device 104), and may provide the notification to a user.

In an embodiment, the device management application may manage enabling or disabling of functions associated with least a portion of an external electronic device (e.g., the external electronic device itself, or one or more components of the external electronic device) in communication with the electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the proxy administrator module 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the proxy administrator module 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. In an embodiment, the display 150 may display a Graphical User Interface (GUI) with which a user may interact with the electronic device 101.

The communication interface 160 may provide communication between the electronic device 101 and one or more external electronic devices (e.g., the electronic device 104, the server 106, and/or the like). For example, the communication interface 160 may communicate with the external electronic device by establishing a connection with a network 162 using wireless or wired communication. In an embodiment, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. In an embodiment, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between the electronic device 101 and an external electronic device may be supported by, for example, at least one of the application 134, the API 133, the middleware 132, the kernel 131, the communication interface 160, and/or the like.

Figure 2:
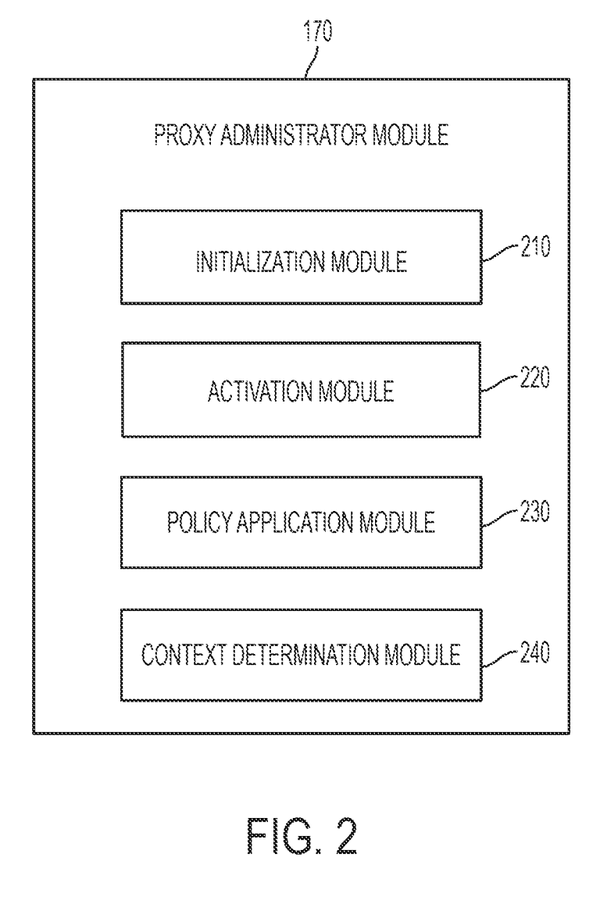
FIG. 2 is a block diagram of an electronic device according to an embodiment of the present disclosure.

The proxy administrator module 170 may, for example, process at least a part of information received from other components (e.g., the processor 120, the memory 130, the I/O interface 140, the communication interface 160, and/or the like), and provide various information, services, and/or the like to the user in various manners. For example, the proxy administrator module 170 may control via the processor 120 or independently at least some of the functions of the electronic device 101 to communicate or connect to another electronic device (e.g., the electronic device 104, the server 106, and/or the like). FIG. 2 will provide additional information regarding the proxy administrator module 170.

FIG. 2 is a block diagram of an electronic device according to an embodiment of the present disclosure.

Referring to FIG. 2, the proxy administrator module 170 may include an initialization module 210, an activation module 220, a policy application module 230, a context determination module 240, and/or the like.

The initiation module 210 may be configured to, for example, perform initialization of the proxy administrator on a newly created user space. The activation module 220 may be configured to, for example, perform activation of the proxy administrator (e.g., a proxy Mobile Device Management (MDM) agent) on the newly created user space. The policy application module 230 may be configured to, for example, perform the application of policies to the newly created user space. The context determination module 240 may be configured to, for example, determine user space to which to apply the policies.

Figure 3:
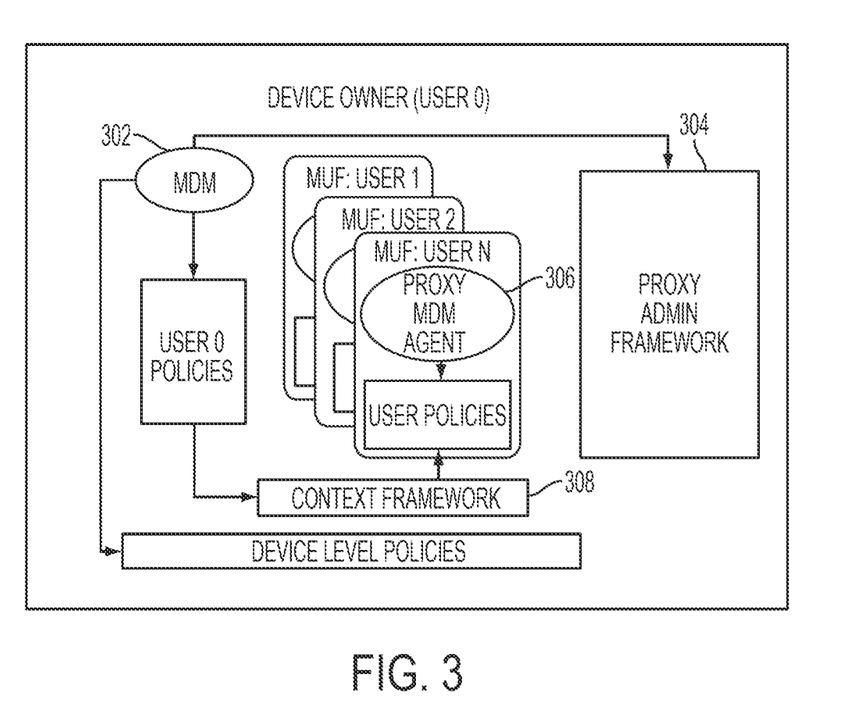
FIG. 3 is a diagram illustrating a configuration in which a device is configured for multiple users according to an embodiment of the present disclosure.

FIG. 3 is a diagram illustrating a configuration in which a device is configured for multiple users according to an embodiment of the present disclosure.

Referring to FIG. 3, the figure illustrates an MDM Agent 302 operating at the device level. The device level operations may correspond to, for example, a device owner (e.g., User 0). The MDM agent 302 may initialize, activate and/or utilize a Proxy Administration Framework 304 and/or a Multi User Framework (MUF; not shown) to create one or more proxy MDM agents 306 in one or more user spaces or containers corresponding to users (e.g., Users 1, 2, . . . , N). When the device administrator or an MDM service provider wishes to apply policies to one or more user spaces, the MDM agent 302 may receive such request and cause the policy to be applied to the appropriate user space by utilizing, for example, the context framework 308. For example, when the MDM agent 302 receives a request to apply a policy from, for example, the device administrator or an external MDM service provider, the MDM agent 302 may receive the policy to be applied from a server. The MDM agent 302 may analyze the policy to determine whether the policy is to be applied at the device level, or to be applied to a specific user space, or both. If the policy is to be applied to a specific user space, the policy may be sent to the context framework 308. The context framework 308 may identify and/or apply the context (e.g., user ID of the policy) in which the policy is to be applied, and the appropriate user space to which the policy is to be applied may be determined using the identified context. The proxy MDM agent 306 of the appropriate user space may also be used in applying the policy.

In an embodiment, the device administrator or an external MDM service provider may send the request to apply the policy directly to the appropriate proxy MDM agent 306, without sending the request to the MDM agent 302. In such case, the proxy MDM agent 306 may obtain the policy for the user space and apply the policy.

Figure 4:
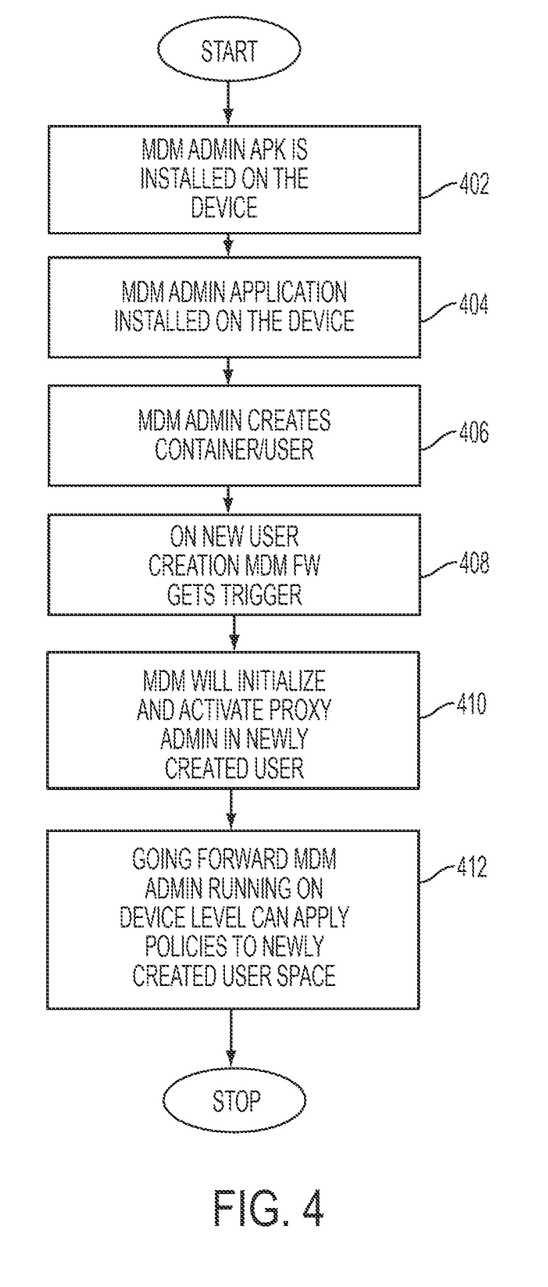
FIG. 4 is a flow diagram illustrating a proxy buildup and setup sequence according to an embodiment of the present disclosure.

FIG. 4 is a flow diagram illustrating a proxy buildup and setup sequence according to an embodiment of the present disclosure.

Referring to FIG. 4, at operation 402, an MDM Application Package file (APK) for installing an MDM administrator (e.g., proxy administrator module or MDM agent 302) may be installed on an electronic device (e.g., electronic device 101). At operation 404, the MDM administrator (e.g., proxy administrator module or MDM agent 302) is installed on the electronic device. At operation 406, the MDM administrator may create a new user space or a container corresponding to the new user. At operation 408, the MDM FW (e.g., proxy administration framework 304) may receive a trigger. At operation 410, the MDM administrator may initialize and activate a proxy administrator (e.g., proxy MDM agent 306) in the newly created user space. At operation 412, the MDM Administrator running at the device level may apply policies to the newly created user space. The policies may be applied at the user space level (e.g., policy may be applied to a specific user space without affecting another user space or the rest of the electronic device).

In various embodiments, example policies may include configuration policies, such as an exchange configuration policy or a WiFi configuration policy; restriction policies, such as a camera restriction policy; application policies, such as an install application policy, a delete application policy, or the like, and may include other device management policies.

Figure 5:
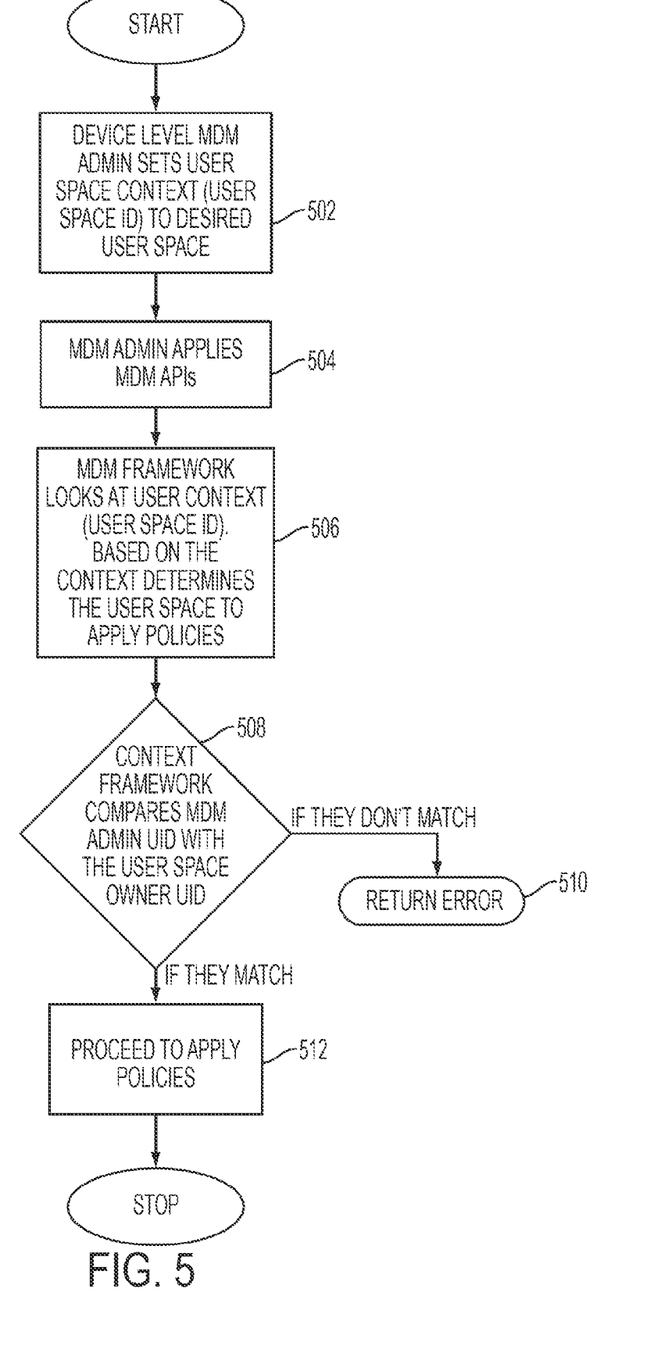
FIG. 5 is flow diagram illustrating Mobile Device Management Agent Application (MDM) control flow according to an embodiment of the present disclosure.

FIG. 5 is flow diagram illustrating MDM control flow according to an embodiment of the present disclosure.

Referring to FIG. 5, at operation 502, the device level MDM administrator (e.g., MDM agent 304) may set a user space context (e.g., designate a user space ID) to a desired user space. At operation 504, the MDM administrator may apply MDM API's. At operation 506, the MDM framework (e.g., proxy administration framework 304), when, for example, a request to apply policies is received, may look at the user context (e.g., user space ID), and based on the context, determine the user space to which to apply the policies. At operation 508, a context framework (e.g., context framework 308) may compare the MDM administrator user ID with the user space owner ID. If the IDs do not match, at operation 510, an error message may be returned. If the IDs match, at operation 512, the policies may be applied to the user space determined at operation 506.

Figure 6:
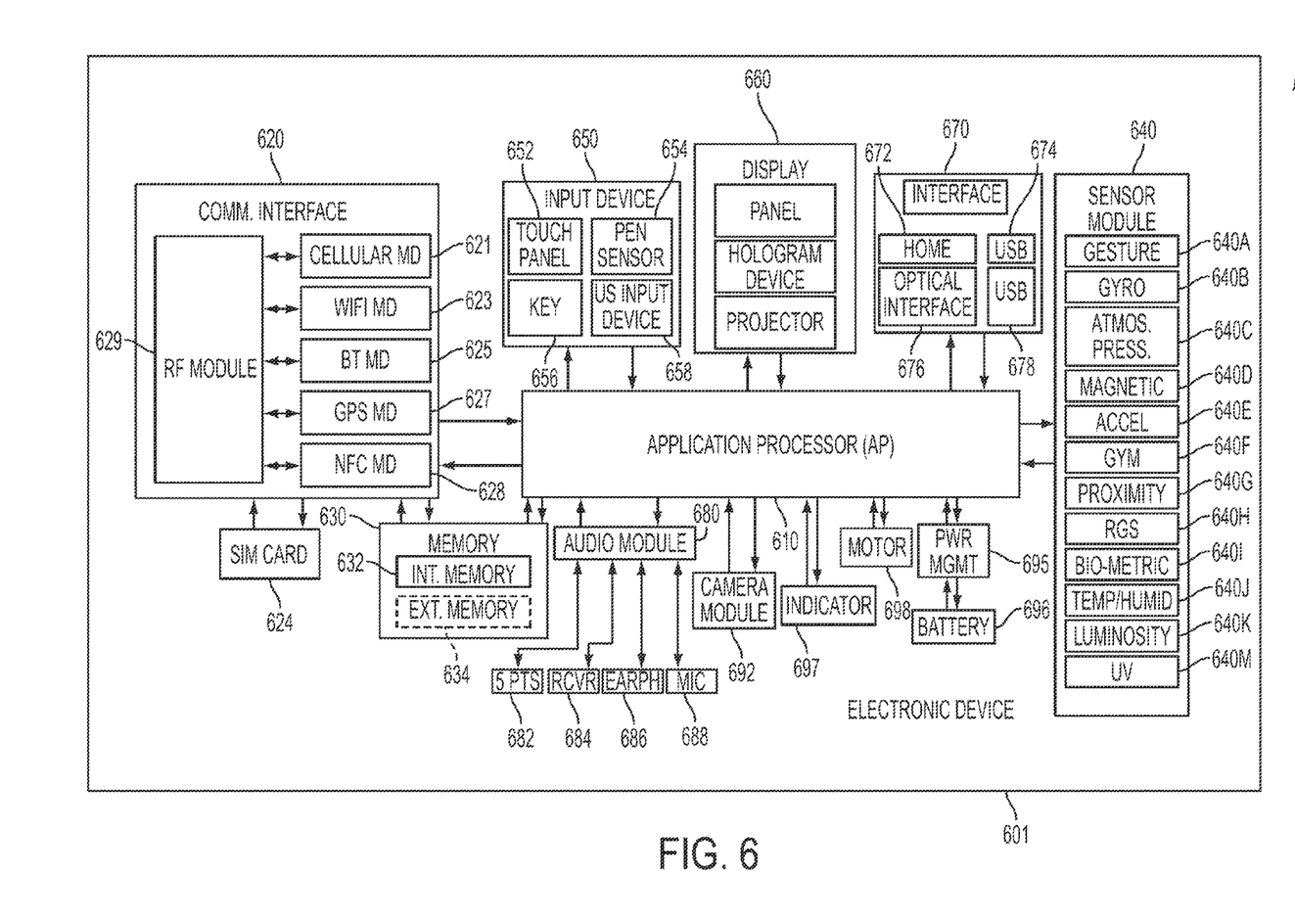
FIG. 6 is a block diagram of hardware according to an embodiment of the present disclosure.

FIG. 6 is a block diagram of hardware according to an embodiment of the present disclosure.

Referring to FIG. 8, hardware 601 may be, for example, a part of or all of the electronic device 101. Referring to FIG. 6, the hardware 601 may include one or more Application Processors (AP) 610, a communication module 620, a Subscriber Identification Module (SIM) card 624, a memory 630, a sensor module 640, an input module 650, a display module 660, an interface 670, an audio module 680, a camera module 691, a power management module 695, a battery 696, an indicator 697, a motor 698, and/or the like.

The AP 610 may control one or more hardware or software components that are connected to AP 610, perform processing or computation of data (including multimedia data), and/or the like. In an embodiment, the AP 610 may be implemented as a System-on-Chip (SoC). The AP 610 may include a Graphics Processing Unit (GPU) (not shown).

The communication module 620 (e.g., the communication interface 160) may transmit and receive data in communications between the electronic device 101 and other electronic devices (e.g., the electronic device 104, the server 106, and/or the like). In an embodiment, the communication module 620 may include one or more of a cellular module 621, a Wi-Fi module 623, a Bluetooth module 625, a GPS module 627, a NFC module 626, a Radio Frequency (RF) module 629, and/or the like.

The cellular module 621 may provide services such as, for example, a voice call, a video call, a Short Messaging Service (SMS), an internet service, and/or the like, via a communication network (e.g., LTE, LTE-A, CDMA, WCDMA, UMTS, WiBro, GSM, and/or the like). In an embodiment, the cellular module 621 may differentiate and authorize electronic devices within a communication network using a SIM card (e.g., the SIM card 624). According to various embodiments of the present disclosure, the cellular module 621 may perform at least a part of the functionalities of the AP 610. For example, the cellular module 621 may perform at least a part of multimedia control functionality.

According to various embodiments of the present disclosure, the communication interface 620 and/or the cellular module 621 may include a Communication Processor (CP). In an embodiment, the cellular module 621 may be implemented as SoC.

Although FIG. 6 illustrates components such as the cellular module 621 (e.g., CP), the memory 630, the power management module 695 as components that are separate from the AP 610, according to various embodiments of the present disclosure, the AP 610 may include, or be integrated with, one or more of the foregoing components (e.g., the cellular module 621).

According to various embodiments of the present disclosure, the AP 610, the cellular module 621 (e.g., CP), and/or the like, may process instructions or data received from at least one of non-volatile memory or other components by loading in volatile memory. The AP 610, the cellular module 621, the communication interface 620, and/or the like, may store at non-volatile memory at least one of data that is received from at least one of other components or data that is generated by at least one of the other components.

Each of the Wi-Fi module 623, the Bluetooth module 625, the GPS module 627, the NFC module 628, and/or the like may, for example, include one or more processors that may process data received or transmitted by the respective modules. Although FIG. 6 illustrates the cellular module 621, the Wi-Fi module 623, the Bluetooth module 625, the GPS module 627, and the NFC module 626 as separate blocks, according to various embodiments of the present disclosure, any combination (e.g., two or more) of the cellular module 621, the Wi-Fi module 623, the Bluetooth module 625, GPS module 627, the NFC module 628, and/or the like may be included in an Integrated Chip (IC) or an IC package. For example, at least some of the processors corresponding to the respective the cellular module 621, the Wi-Fi module 623, the Bluetooth module 625, the GPS module 627, the NFC module 628, and/or the like, may be implemented as a single SoC. For example, a CP corresponding to the cellular module 621 and a Wi-Fi processor corresponding to Wi-Fi module 623 may be implemented as a single SoC.

The RF module 629 may, for example, transmit and receive RF signals. Although not shown, the RF module 629 may include a transceiver, a Power Amp Module (PAM), a frequency filter, a Low Noise Amplifier (LNA), and/or the like. The RF module 634 may include one or more components for transmitting and receiving Electro-Magnetic (EM) waves (e.g., in free space or the like) such as, for example, conductors or conductive wires. Although FIG. 6 illustrates that the cellular module 621, the Wi-Fi module 623, the Bluetooth module 625, the GPS module 627, and the NFC module 628 are sharing one RF module 629, according to various embodiments of the present disclosure, at least one of the cellular module 621, the Wi-Fi module 623, the Bluetooth module 625, the GPS module 627, the NFC module 628, and/or the like may transmit and receive RF signals via a separate RF module.

The SIM card 624 may be a card implementing a SIM, and may be configured to be inserted into a slot disposed at a specified location of the electronic device. The SIM card 624 may include a unique identifier (e.g., Integrated Circuit Card IDentifier (ICCID)) subscriber information (e.g., International Mobile Subscriber Identity (IMSI)), and/or the like.

The memory 630 (e.g., memory 130) may include an internal memory 632, an external memory 634, or a combination thereof.

According to various embodiments of the present disclosure, the internal memory 632 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 632 may be a Solid State Drive (SSD). In an embodiment, the external memory 634 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 634 may be operatively coupled to the electronic device 601 via various interfaces. According to various embodiments of the present disclosure, the electronic device 601 may include recording devices (or recording media) such as, for example, Hard Disk Drives (HDD), and/or the like.

The sensor module 640 may measure physical/environmental properties detect operational states associated with the electronic device 601, and/or the like, and convert the measured and/or detected information into signals such as, for example, electric signals or electromagnetic signals. In an embodiment, the sensor module 640 may include at least one of a gesture sensor 640A, a gyro sensor 640B, an atmospheric pressure sensor 640C, a magnetic sensor 640D, an accelerometer 640E, a grip sensor 640F, a proximity sensor 640G, an RGB sensor 640H, a biometric sensor 640I, a temperature/humidity sensor 640J, a luminosity sensor 640K, a Ultra Violet (UV) sensor 640M, and/or the like. The sensor module 640 may detect the operation state of the electronic device and/or measure physical properties, and convert the detected or measured information into electrical signals. Additionally or alternatively, the sensor module 640 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 640 may also include control circuitry for controlling one or more sensors included therein.

The input module 650 may include a touch panel 652, a (digital) pen sensor 654, a key 656, an ultrasonic input device 658, and/or the like.

In an embodiment, the touch panel 652 may detect a touch input using capacitive, resistive, infrared, ultrasonic methods, and/or the like. The touch panel 652 may also include a touch panel controller (not shown). In an embodiment, a capacitive-type touch panel may detect proximity inputs (e.g. hovering input) in addition to, or as an alternative to, physical touch inputs. The touch panel 652 may also include a tactile layer. According to various embodiments of the present disclosure, the touch panel 652 may provide haptic feedback to the user using the tactile layer.

In an embodiment, the (digital) pen sensor 654 may be implemented using methods identical to or similar to receiving a touch input from a user, or using a separate detection sheet (e.g., a digitizer).

In an embodiment, the key 656 may be a keypad, a touch key, and/or the like.

In an embodiment, the ultrasonic input device 658 may be a device configured to identify data by detecting, using a microphone (e.g., microphone 688), ultrasonic signals generated by a device capable of generating the ultrasonic signal. The ultrasonic input device 658 may detect data wirelessly.

According to various embodiments of the present disclosure, the electronic device 601 may receive user input from an external device (e.g., a network, computer or server) connected to the electronic device 601 using the communication module 620.

The display module 660 (e.g., display 150) may include a panel 662, a hologram device 664, a projector 666, and/or the like. In an embodiment, the panel 662 may be, for example, a Liquid-Crystal Display (LCD), an Active-Matrix Organic Light-Emitting Diode (AM-OLED) display, and/or the like. In an embodiment, the panel 662 may be configured to be flexible, transparent, and/or wearable. The panel 662 and the touch panel 652 may be implemented as a single module. The hologram device 664 may provide a three-dimensional image. For example, the hologram device 664 may utilize the interference of light waves to provide a three-dimensional image in empty space. The projector 666 may provide an image by projecting light on a surface (e.g., a wall, a screen, and/or the like). In an embodiment, the surface may be positioned internal or external to electronic device 601. According to various embodiments of the present disclosure, the display module 660 may also include a control circuitry for controlling the panel 662, the hologram device 664, the projector 666, and/or the like.

The interface 670 may include, for example, one or more interfaces for a High-Definition Multimedia Interface (HDMI) 672, a Universal Serial Bus (USB) 674, a projector 676, a D-subminiature (D-sub) 678, and/or the like. In an embodiment, the interface 670 may be part of the communication interface 620. Additionally or alternatively, the interface 670 may include, for example, one or more interfaces for Mobile High-definition Link (MHL), Secure Digital (SD)/MultiMedia Card (MMC), Infrared Data Association (IrDA), and/or the like.

The audio module 680 may encode/decode sound into electrical signal, and vice versa. According to various embodiments of the present disclosure, at least a portion of audio module 680 may be part of the I/O interface 140. In an embodiment, the audio module 680 may encode/decode voice information that is input into, or output from, the speaker 682, the receiver 684, the earphone 686, the microphone 688, and/or the like.

The camera module 691 may capture still images and/or video. According to various embodiments of the present disclosure, the camera module 691 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 695 may manage electrical power of the electronic device 601. Although not shown, the power management module 695 may include, for example, a Power Management Integrated Circuit (PMIC), a charger Integrated Circuit (charger IC), a battery gauge, a fuel gauge, and/or the like.

In an embodiment, the PMIC may be disposed in an integrated circuit or an SoC semiconductor. The charging method for the electronic device 601 may include wired or wireless charging. The charger IC may charge a battery, may prevent excessive voltage or excessive current from a charger from entering the electronic device 601, and/or the like. According to various embodiments of the present disclosure, the charger IC may include at least one of a wired charger IC or a wireless charger IC. In an embodiment, the wireless charger IC may be a magnetic resonance type, a magnetic induction type, an electromagnetic wave type, and/or the like. In an embodiment, the wireless charger IC may include circuits such as a coil loop, a resonance circuit, a rectifier, and/or the like.

In an embodiment, the battery gauge may measure a charge level, a voltage while charging, a temperature of battery 696, and/or the like.

In an embodiment, the battery 696 may supply power to the electronic device 601. In an embodiment, the battery 696 may be a rechargeable battery, a solar battery, and/or the like.

The indicator 697 may indicate one or more states (e.g., boot status, message status, charge status, and/or the like) of the electronic device 601 or a portion thereof (e.g., AP 610). Motor 698 may convert an electrical signal into a mechanical vibration.

Although not shown, the electronic device 601 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method of receiving a policy, the method comprising:
creating, using a device level mobile device management agent in an electronic device, a separate proxy mobile device management agent inside each of a plurality of user spaces of the electronic device;
analyzing the policy, using the device level mobile device management agent, to determine a level at which the policy is to be applied;
determining a context based on the policy;
when it is determined that the policy is to be applied at a level of a specific user space of the plurality of user spaces, applying the policy using the proxy mobile device management agent inside the specific user space of the plurality of user spaces, based at least in part on the determined context, to the specific user space of the plurality of user spaces; and
when it is determined that the policy is to be applied at the device level, applying the policy using the device level mobile device management agent, based at least in part on the determined context, at the device level.

2. The method of claim 1, wherein the context comprises a user ID.

3. The method of claim 1, wherein the policy is received at the device level mobile device management agent.

4. The method of claim 1, wherein the applying of the policy comprises:
determining the user space based at least in part on the context; and
applying the policy to the user space via a context framework.

5. An electronic device comprising:
a computer processor; and
a memory including stored instructions executable by the computer processor and configured to cause to the computer processor to:
manage, by a device level mobile device management agent in the electronic device, a user space of a plurality of user spaces of the electronic device, the device level mobile device management agent configured to:
create a proxy mobile device management agent inside each of a plurality of user spaces of the electronic device,
analyze a policy to determine a level at which the policy is to be applied,
determine a context based on the policy,
when it is determined that the policy is to be applied to a specific user space of the plurality of user spaces, apply the policy using the proxy mobile device management agent inside the specific user space, based at least in part on the determined context, to the specific user space, and
when it is determined that the policy is to be applied at the device level, applying the policy using the device level mobile device management agent, based at least in part on the determined context, at the device level.

6. The electronic device of claim 5, wherein the proxy mobile device management agent inside the specific user space; receives a policy, and wherein the determination that the policy is to be applied to the specific user space is made based at least in part on a comparison of a user ID of the policy and an owner ID of the specific user space.

7. The electronic device of claim 6, further comprising:
when the user ID of the proxy mobile device management agent inside the specific user space and the owner ID of the specific user space do not match, returning an error message.

8. The electronic device of claim 6, wherein the device level mobile device management agent further comprises:
an initialization portion;
an activation portion;
a policy application portion; and
a context determination portion.

9. The electronic device of claim 8, wherein the initialization portion performs initialization of the proxy mobile device management agent in the user space when the user space is newly created.

10. The electronic device of claim 8, wherein the activation portion performs activation of the proxy mobile device management agent in the newly created user space.

11. The electronic device of claim 8, wherein the policy application portion performs the application of policies to the newly created user space.

12. The electronic device of claim 5, wherein the policy is applied, using a context administration framework, to the user space.

13. The electronic device of claim 12, wherein the context administration framework is configured to determine the user space to which to the policy is applied.

14. A non-transitory computer processor readable storage medium including instructions, executable by a processor, stored thereon to perform a method comprising:
- creating, using a device level mobile device management agent in an electronic device, a proxy mobile device management agent inside each of a plurality of user spaces of the electronic device;
- analyzing a policy, using the device level mobile device management agent, to determine a level at which the policy is to be applied;
- determining a context based on the policy;
- when it is determined that the policy is to be applied at a level of a specific user space of the plurality of user spaces, applying the policy using the proxy mobile device management agent inside the specific user space of the plurality of user spaces, based at least in part on the determined context, to the specific user space of the plurality of user spaces; and
- when it is determined that the policy is to be applied at the device level, applying the policy using the device level mobile device management agent, based at least in part on the determined context, at the device level.

15. The non-transitory computer processor readable storage medium of claim 14,
- wherein the determination that the policy is to be applied to the specific user space is made based at least in part on a comparison of a user ID of the policy and an owner ID of the specific user space.

16. The non-transitory computer processor readable storage medium of claim 14, further comprising:
- when the user ID of the policy and the owner ID of the specific user space do not match, returning an error message.

* * * * *